Feb. 10, 1942.  R. F. WILSON  2,272,886
VALVE CONSTRUCTION
Filed Feb. 6, 1939

INVENTOR
Robert F. Wilson
BY
Ely & Frye
ATTORNEYS

Patented Feb. 10, 1942

2,272,886

UNITED STATES PATENT OFFICE 2,272,886

VALVE CONSTRUCTION

Robert F. Wilson, Akron, Ohio, assignor to The Firestone Tire & Rubber Company, Akron, Ohio, a corporation of Ohio Application February 6, 1939, Serial No. 254,818

6 Claims. (Cl. 152—430)

This invention relates generally to valves for pneumatic tires.

Pneumatic tires, of course, sometimes go flat and in such cases the tire will usually be rotated a short distance while flat before the car on which the tire is mounted can be halted. During this interval of rotation when flat, the tube in the pneumatic tire is subjected to severe strains. That is, the tube is compressed at the bottom of the tire, while at the same time there is a force attempting to produce relative rotation between the tire and tube and the wheel. In all events, the tube has a rotational force thereon which will at least distort the tube in case the tube is not free for rotation. The only element positively preventing rotation of the tube, when the tire is flat, is the valve which is engaged with the rim on the wheel assembly. When this valve is freed from the rim then the tube can be moved relative to the rim, wheel, or tire and it generally has considerably less stress set-up therein than when it is fixedly held against rotation.

Another objection to running tires when flat is that the valve on the tire may be pressed into, and cut, the tube wall opposite to the valve, as the base of the valve is not covered by any protective coating.

The general object of this invention is to provide a valve for a pneumatic tube, which valve is adapted to free itself from the tire rim when the tire is deflated; also to reduce valve cutting of the tube when the wheel assembly is rotated when flat.

Another object of the invention is to provide a sturdy valve body which is freely pivotable about a point intermediate its ends to permit ready movement of its ends. Still another object is to provide a valve structure which is quite flexible, but which cannot be pushed entirely through the aperture in the tire rim with which it is associated, when in a wheel assembly. Other objects will be manifest as the specification proceeds.

The invention will be defined particularly with reference to the accompanying drawing in which.

Figure 1:
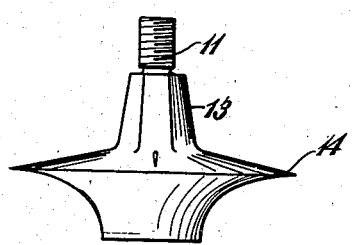
Figure 1 is an elevation of a valve embodying the invention.

Referring more specifically to the drawing, a valve tube 10 is shown, said tube being of standard construction and having a threaded upper end portion 11 and a roughened exterior surface 12 adjacent the base or bottom portion of the valve tube. A rubber body, or sleeve 13, of any suitable composition, is integral with and surrounds the valve tube 10. The rubber body 13 preferably is vulcanized to the valve tube by any known method, the roughened surface 12 of the valve tube strengthening the bond between the rubber and the valve tube. A flange 10a may be formed on the upper portion of the valve tube 10, as shown, to aid in securing the rubber body to the valve tube.

Figure 2:
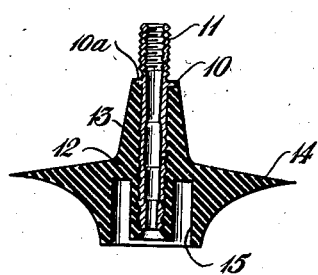
Figure 2 is a vertical section along the center of the valve of Figure 1.
Figure 3:
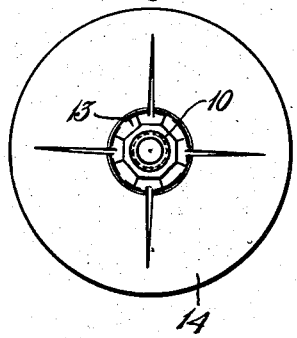
Figures 3 and 4 are top and bottom plans, respectively, of Figure 1.
Figure 4:
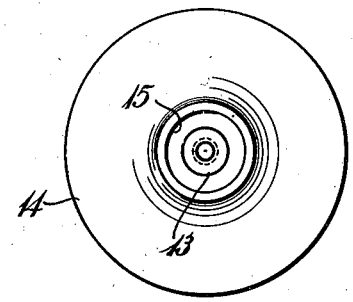

Figure 2 best shows that a circular flange 14 is formed on the rubber body 13 to facilitate securing the valve of the invention to the wall of an inner tube of a pneumatic tire. The flange portion 14 naturally is of larger diameter than the remaining portion of the rubber body 13 and this increased diameter decreases gradually from the top of the flange 14 to the bottom thereof which is adjacent the base of the valve tube 10. It will be observed that the rubber body 13 extends a slight distance below the valve tube to protect or cover the base thereof.

To free the valve tube for movement at the ends thereof, a circular recess 15 is formed in the base of the rubber body 13 and it extends into the rubber body to a point substantially in the plane of the upper portion of the flange 14. This recess 15 is of appreciable width, as seen in Figure 2, and is spaced from the metal valve tube 10 by a thin layer of rubber. Figure 2 shows that a unit is formed by the valve tube and the portion of the rubber body 13 immediately adjacent or surrounding it and the outer portion of the flange 14, as determined by the recess 15, is substantially separate from the unit so formed. However, the portion of the rubber body 13 between the valve tube 10 and the flange 14 connects them in a flexible manner so that relative movement therebetween is permitted as the valve tube is fulcrumed on said portion of the rubber body. In other words, the ends of the valve tube 10 are readily movable, or distortible from their normal perpendicular relationship to the flange 14. This characteristic of the valve tube is highly desirable as it permits the valve body to be distorted when the tube is deflated on a wheel assembly. Then the distortion of the valve tube with relation to the valve assembly permits the valve assembly to slide from the aperture in the rim in which it normally is inserted. This reduces stresses in the tube when the wheel assembly is run while flat and is very desirable in present wheel assemblies.

Figure 5:
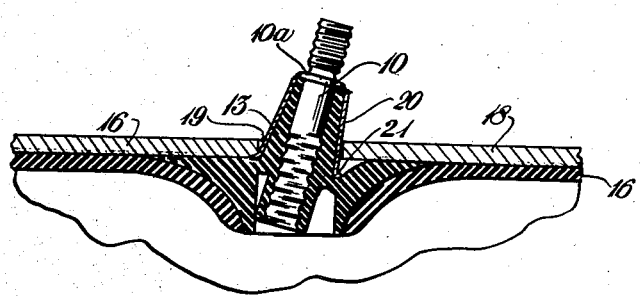
Figure 5 is a fragmentary sectional view of the valve of the invention, mounted on a wheel assembly, as it starts to disengage from the rim with which it is associated.

In Figure 5 the valve of the invention is shown secured to the wall of an ordinary inner tube 16. It is seen that the curvature of the lower portion of the flange 14 permits a smooth connection to be formed between the rubber body 13 and the wall. Tube 16 is mounted in a tire (not shown) and the tire and tube are mounted on a standard rim 18. The valve of the tube is inserted through a hole 19 in the rim, as shown. Of course, when the tube 16 is inflated, there is considerable pressure attempting to force the valve completely through the hole 19 in the rim. To prevent this from occurring, a metal ferrule 20 is placed over, and snugly fits on, the upper portion of the valve body 10, as shown. The ferrule is substantially frusto-conical in shape and has a base flange 21 formed thereon which engages with the portion of the rim defining the hole 19 and acts to transmit the outwardly directed force on the valve to the rim. This prevents the air pressure in the tube 17 from forcing the valve through the rim. Another desirable function of the ferrule 20 is evident when the wheel assembly with which it is associated is run while flat. The metallic surface of the ferrule has a low coefficient of friction with the face of the hole in the rim so that it slides readily over such surface and facilitates disengagement of the valve and rim. In fact, the metal ferrule and the construction of the valve which facilitates movement of the ends of the valve combine to insure, practically, disengagement of the valve and the rim and permit relative movement therebetween when the wheel assembly is run while flat. The short length of valve tube 10 also contributes to this disengaging action.

From the foregoing description it will be apparent that a valve having novel and desirable characteristics has been provided and that the objects of the invention have been realized.

While a written description and illustration of one embodiment of the invention is disclosed herein, it will be understood that various modifications can be made without departing from the scope of the invention as defined in the appended claims.

What is claimed is:

1. A valve for a pneumatic tire comprising a metal valve tube, a sleeve of rubber circumscribing and integral with said valve tube, said rubber sleeve having a flange extending an appreciable distance therefrom intermediate its ends, a rubber protuberance extending from said flange toward the base of said tube, the thickness of said protuberance gradually decreasing from said flange to the base of the valve, said protuberance having an annular recess extending around said valve tube and an appreciable distance into said protuberance from its base whereby the unit formed by said valve tube and the rubber in contact therewith can be pivoted at said rubber flange and the ends of said unit be given appreciable movement.

2. A rubber protuberance extending from said flange toward the base of said tube, comprising a valve tube, a rubber body surrounding and integral with said valve tube, said rubber body having a circular flange formed thereon which is of maximum diameter intermediate the ends of said valve tube and which decreases gradually in diameter towards the base of said valve tube whereby the flanged portion adjacent the base of said valve tube forms a surface adapted to be secured to the wall of a pneumatic inner tube and form a smooth connection therewith, the bases of said rubber body and valve tube extending into the pneumatic tube, with which it is associated, an appreciable distance.

3. In a wheel assembly including a rim having a hole therethrough, a tire, and a tube, the combination of a valve tube secured to said tube and extending through the hole in said rim, a rubber body binding said valve tube to said tube, said rubber body having a recess in it around the base of said valve tube, and a metal ferrule positioned upon said valve tube and engaging with the walls defining the hole in said rim to prevent said valve tube from being forced therethrough.

4. A valve for a pneumatic tire or tube comprising a valve tube, and a rubber body encircling said valve tube, said rubber body having an annular recess extending into the base thereof around said valve tube and a flange formed thereon intermediate the ends of said valve tube for securing the valve to a pneumatic tube, said recess extending into said rubber body only to approximately the plane of said flange whereby said valve tube is readily movable relative to the portion of the pneumatic tube with which it is associated due to the annular recess formed in said rubber body.

5. A valve for a pneumatic tire comprising a metal valve tube, and a rubber sleeve bonded to and mounting said valve tube, said tube extending substantially the length of the rubber sleeve, said rubber sleeve being appreciably enlarged at one end to form a substantially conical protuberance thereon the base of which is approximately in the middle of the valve, an annular recess being formed in said protuberance around said valve tube, which recess extends into said rubber protuberance to about the base thereof whereby said valve tube and the portion of said rubber sleeve bonded thereto can be readily pivoted about the base of said protuberance.

6. In combination, a pneumatic tube and a valve assembly secured to said tube and extending into same, said valve assembly comprising a metal valve tube, and a rubber body encompassing said valve tube adjacent an end thereof which extends into said tube, said rubber body having a thick flange formed thereon adjacent the inner end of said valve tube and gradually increasing in diameter from its axially inner to its axially outer surface, said flange having a substantially planar axially outer surface which has a feather edge, said valve assembly being secured to said pneumatic tube by the tapered surface of said flange being superimposed on said pneumatic tube with the outer surface of said flange being substantially flush with the adjacent outer surface of said pneumatic tube when said pneumatic tube is confined and inflated, whereby said valve assembly extends in both directions from the surface of said pneumatic tube.

ROBERT F. WILSON.

CERTIFICATE OF CORRECTION.

Patent No. 2,272,886. February 10, 1942.

ROBERT F. WILSON.

It is hereby certified that error appears in the printed specification of the above numbered patent requiring correction as follows: Page 2, first column, lines 70 and 71, claim 2, for "A rubber protuberance extending from said flange toward the base of said tube," read "In combination, a pneumatic tube, and a valve assembly, said valve assembly--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.